United States Patent [19]

Nelson

[11] Patent Number: 4,662,644
[45] Date of Patent: May 5, 1987

[54] MEANS FOR CYCLICALLY ENHANCING DRIVING TORQUE

[76] Inventor: Victor H. Nelson, 10 Redwood Dr., Dix Hills, N.Y. 11746

[21] Appl. No.: 719,715

[22] Filed: Apr. 3, 1985

[51] Int. Cl.⁴ .............................................. B60K 1/00
[52] U.S. Cl. .................................. 280/214; 180/205; 280/217
[58] Field of Search ...................... 280/217, 214, 215; 74/594.1, 594.2, 821, 572; 180/205

[56] References Cited
U.S. PATENT DOCUMENTS 4,062,421  12/1977  Weber .................................. 280/214
4,380,180  4/1983  Foote et al. .......................... 74/821

FOREIGN PATENT DOCUMENTS 863  1/1900  Fed. Rep. of Germany ..... 74/594.1

*Primary Examiner*—John J. Love
*Assistant Examiner*—Mitchell J. Hill
*Attorney, Agent, or Firm*—Edward H. Loveman

[57] ABSTRACT

A device for cyclically enhancing driving torque in a mechanical assembly having a torque driven rotatable body, including a nonrotatable support carrying the body a drive means applying driving torque to the rotatable body fixed magnetic members, and a rotatable magnetic means arranged to react intermittently to enhance cyclically the driving torque applied to the driven body. The torque driven body exerts a flywheel driving effect on the magnetic members to rotate them between angular positions when the magnetic members are not enhancing the driving torque.

5 Claims, 6 Drawing Figures

MEANS FOR CYCLICALLY ENHANCING DRIVING TORQUE

This invention relates to magnetic motive means, and more particularly relates to intermittently applying a magnetic motive means to enhance the driving torque applied to a driven body.

The invention is particularly applicable to enhance the turning torque of a drive sprocket of a bicycle type vehicle but is generally applicable to other mechanisms wherein intermittently applied turning torque during enhanced times when the turning torque is applied, and the torque enhancing elements are carried by the flywheel effect or inertia through positions of stability to positions of instability.

The use of flywheels of various types have been known in the prior art for stabilizing the rate of rotation of an associated wheel. Such flywheels have included mechanical structures for adjusting the amount of centrifugal force applied, and as mechanical declutching devices for disabling the flywheels.

The present invention by contrast employs magnetic drive means for enhancing the turning torque of a rotary device only during those parts of a rotational cycle when the turning torque is applied, and for relaxing the magnetic drive means during those times when the rotary device is rotated by inertia of rotating parts, i.e. the so called "flywheel effect".

A basic purpose of the invention is to provided means for applying torque enhancing forces during the angular sectors when the rider of a bicycle is applying turning torque alternately by right foot and left foot during each turn of the drive sprocket. These angular sectors may be approximately 90°. The flywheel effect is utilized to overcome the negative torque contributions for those angular sectors when the rider does not apply force to the pedals.

According to the invention, the soft iron drive sprocket holder of the bicycle may contain spaced stator poles, i.e. N and S poles. The sprocket holder may complete the magnetic flux path. Attached to a crank which rotates the sprocket is a bar of magnetic material which serves as an armature. A reverse structure may be used wherein the rotor is a permanent magnet and the stator elements are made of magnetic soft iron. The rotor is phased or arranged with respect to the stator elements so that the enhancing torque occurs during successive and alternate applications of right foot and left foot pressure to the drive sprocket by the rider of the bicycle.

Further in accordance with the invention, the stator includes a pair of cylindrically curved spaced segments. The rotor turns inside the stator segments. The segments may be permanent magnets of opposite polarity, whereas the rotor is a bar of magnetic soft iron. Alternatively the cylindrical segments of the stator may be magnetic soft iron whereas the rotary armature is a bar magnet. In either case, the rotor will be in a mechanically unstable position when the magnetic flux path through the rotor and stator is maximum in length and the rotor will be in mechanically stable position when the magnetic flux path length is minimum. The tendency of the rotor to turn due to a flywheel effect when in unstable positions is utilized to apply enhancing turning torque during portions of a turning cycle of a rotary body. At times when the body turns due to flywheel effect when no turning torque is applied, the rotor is turned from stable to unstable positions to position it for enhancing turning torque. When the invention is applied to a bicycle, the bicycle may be driven with less muscular effect than required for a bicycle not equipped with the invention.

It is therefore, a principal object of the present invention to provide a rotary body such as a drive sprocket in a bicycle with a magnetic rotor which is so disposed with respect to a magnetic stator whereby they interact magnetically, so that the rotor will tend to turn to enhance the turning or driving torque of the sprocket.

A further object of the present invention is to provide a magnetic torque enhancing means for a rotary body, comprising a stator having elements within which rotates a rotor that alternately assumes unstable and stable positions as the length of reluctance of the magnetic flux path between the stator and the rotor is alternately maximized and minimized respectively.

Another object of the present invention is to provide drive torque enhancing means as described wherein the stator elements are spaced permanently magnetized cylindrical segments and the rotor is a bar of magnetic iron, or alternatively wherein the stator elements are magnetic cylindrical segments and the stator is a bar magnet. These and other objects and many of the attendant advantages of this invention will be readily appreciated as the same becomes better understood by reference to the following detailed description when considered in connection with the accompanying drawings in which.

Figure 1:
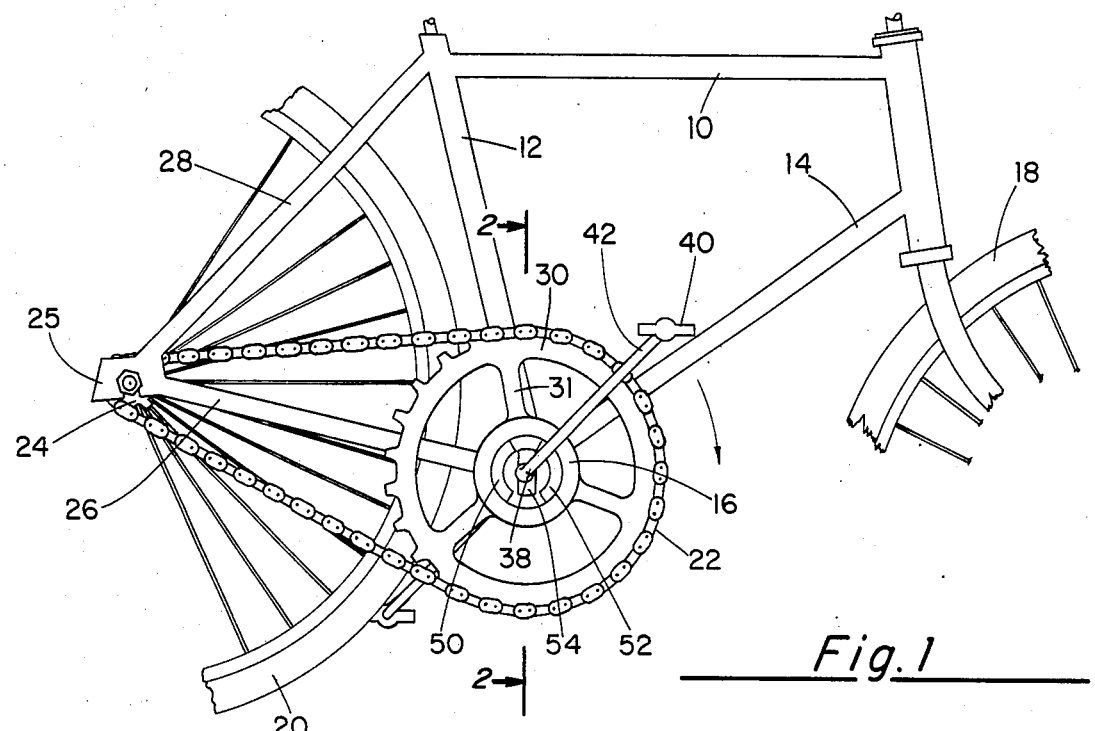
FIG. 1 is a side elevational view of the portion of a bicycle provided with a torque enhancer device embodying the invention, parts being omitted to show internal construction.
Figure 2:
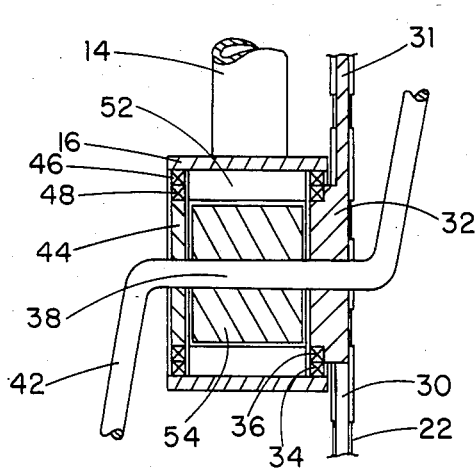
FIG. 2 is a fragmentary vertical sectional view on an enlarged scale taken along line 2—2 of FIG. 1.

Referring now to the drawings wherein like reference characters designate like or corresponding parts throughout, there is illustrated in FIGS. 1 and 2 a bicycle frame 10 having tabular frame members 12 and 14 secured to a fixed, nonrotatable, axially horizontal cylindrical hub 16. The hub 16 is held stationary with respect to rotatable wheels 18, 20. The rear wheel 20 is driven by a drive chain 22 engaged on a small sprocket 24 carried by the rear wheel 20 and rotatably supported by bearings journaled in a hub 25 carried by arms 26, 28 of the frame 10. The drive chain 22 is entrained on a large sprocket 30 which has spider arms 31 connected to an inner bearing plate 32; see FIG. 2. The bearing plate 32 is journaled in bearings 34, 36 at one end of the hub 16 to rotate in the hub. A crankshaft 38 is engaged with the plate 32 to rotate the plate 32 and the sprocket 30 when a pedal 40 at one end of a crank arm 42 is revolved. Another bearing plate 44 secured to the shaft 38 is located at the other end of the hub 16 and rotates in bearing 46, 48. The plate 44 rotates with the crankshaft 38. To the extent described the structure is conventional.

Now according to the invention, two cylindrically curved arcuate permanent magnets 50 and 52 are disposed in diametrically opposed position inside the hub 16 and are secured therein in fixed position to constitute stator poles. The magnets 50 and 52 have opposite poles N and S and each extends arcuately somewhat more than 90° circumerentially of the hub 16. A soft iron magnetic bar 54 serves as a rotor or rotary armature. The bar 54 is mounted on the crankshaft 38 and rotates therewith. The rotation of the bar 54 serves to enhance driving torque of the sprocket 30 during operation of the device as will be explained below. The hub 16 is made of soft iron and completes the magnetic path for magnetic flux between the magnets 50, 52.

Figure 5:
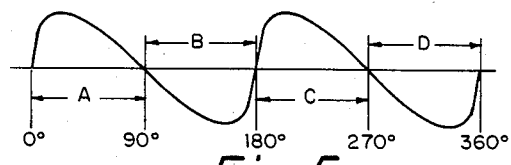
FIG. 5 is a diagram used in explaining the mode of operation of the invention.

During the angular 90° sector A of one cycle of rotation (as indicated in FIG. 5 when the right foot of the rider is applying torque to the sprocket 30 via the pedals 40, the crankshaft 38 and the bearing plates 32, 44) the armature 54 interacts with the magnets 50, 52, to enhance the positive applied torque. During the subsequent 90° sector (90°–180°) when the rider's right foot is applying minimum driving torque, the flywheel effect takes over. This effect involves the inertia or kinetic centrifugal, rotational force of the wheels 18, 20 the pedals 40 the crankshaft 38, the sprocket 30, the armature 54, and other rotating parts of the mechanism. This flywheel effect carries the armature 54 through sector B so that negative torque is minimized. When the rider's left foot is applying turning torque angular sector C starts and extends from 180° to 270° of the turning cycle. Again the armature 54 interacts with the magnets 50 and 52 to enhance the positive applied torque. During sector D which extends from 270° to 360° negative torque is again minimized by the flywheel effect as the rider's left foot applies minimum torque.

Figure 4:
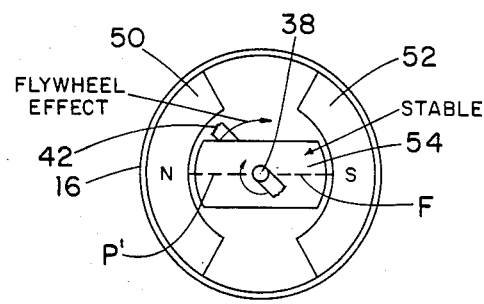
FIG. 3 and FIG. 4 are diagrams of essential elements of the torque enhancer device, used in explaining the invention.
Figure 3:
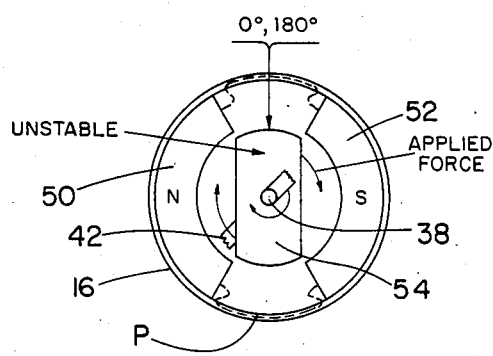

It will be understood by referring to FIGS. 3 and 5, that in the 0° and 180° positions of the rotating armature 54 with respect to the fixed poles 50, 52 the position of the armature 54 is unstable. The magnetic flux in path P encounters high reluctance in the narrow wall of the soft iron hub 16. The flux tends to follow a low reluctance path through the armature 54, thus the armature 54 tends to rotate with respect to stator 50, 52. In the 90° and 270° armature positions (see FIG. 4) the armature 54 is most stable since the reluctance of flux path P' is minimal. However the armature 54 is then being turned by the flywheel effect of the rotating parts so that the armature is carried through the sectors B and D (see FIG. 5) where the rider is applying minimal torque to turn the drive sprocket 30.

Figure 6:
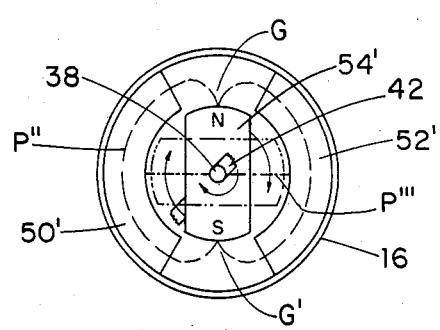
FIG. 6 is a diagram similar to FIG. 3 illustrating another embodiment of the invention.

In a modification of the invention, bar 54' may be a permanent magnet with opposite N and S poles as shown in FIG. 6. Cylindrical segments 50' and 52' may then be made of magnetic soft iron. In the vertical position of the magnet 54' the magnet flux path P'' is through the air gaps G, G' which have high reluctance. The bar 54' will tend to rotate 90° to pass the magnetic flux in path P''' through the segments 50', 52' which have low magnetic reluctance. In each embodiment of the invention shown in FIGS. 3 and 6 respectively the rotating armature 54 or the permanent magnet 54' will be so arranged or phased with respect to the magnets 50, 52, or the segments 50', 52' that enhancing torque occurs during application of right foot or left foot pressure alternately to the drive sprocket 30; while the flywheel effect will carry the rotating armature or magnet through angular sectors when torque is not being enhanced.

Although the enhancing torque is illustrated in FIG. 5 as occurring during alternate 90° angular sectors of rotation other rotational angles can be selected, to apply enhancement of torque during such other selected angular sectors, and to employ the flywheel effect to carry the rotor through the times when negative or minimal torque is applied.

It should be understood that the foregoing relates to only a limited number of preferred embodiments of the invention which have been by way of example only and that it is intended to cover all changes and modifications of the example of the invention herein chosen for the purposes of the disclosure which do not constitute departures from the spirit and scope of the invention.

What is claimed is:

1. A device for cyclically enhancing driving torque in a mechanical assembly, comprising:

a torque driven rotatable body;

a nonrotatable cylindrical support of soft iron carrying said body;

drive means operatively connected to said body for applying driving torque thereto;

a pair of fixed, spaced, arcuate permanent magnetic stator poles carried within said support in fixed positions; and a rotary soft armature surrounded by said stator poles and carried by said drive means and rotatable therewith, whereby when said rotary armature is positioned beyond the midpoint of the angular space between said stator poles the enhancement of said driving torque is maximum, and when said rotor armature is angularly positioned midway between the arcuate extent of said stator poles the reluctance path between said rotary armature and said stator poles is shortest, and the enhancement of said driving torque is minimum and whereby said body exerts a flywheel driving effect on said rotary armature to rotate the same from the minimum reluctance path between said rotary armature to a position beyond the midpoint of the angular space between said stator poles.

2. A device as defined in claim 1, further comprising:
   a driven wheel; and
   mechanical transmissions means operatively connecting said wheel and said body so that said wheel is driven by cyclically enhanced drive torque when said drive means applies drive torque to said body.

3. A device as defined in claim 1, wherein said rotatable body is a mechanical drive sprocket;
   said device further comprising:
   a driven wheel
   an endless drive chain operatively connecting said wheel and said sprocket so that said wheel is driven by cyclically enhanced drive torque when said drive means applies drive torque to said sprocket.

4. A device as defined in claim 3, wherein said nonrotatable support is a hub, and wherein said drive means is a crank, said stator poles being mounted in said hub, and said rotary armature being carried by said crank and rotating within said hub.

5. A device as defined in claim 4, wherein said stator poles comprises two circumferentially spaced cylindrical segments, and wherein said rotary armature comprises a bar rotated between said segments.

* * * * *